United States Patent [19]

Hamilton, Jr. et al.

[11] Patent Number: 4,683,411
[45] Date of Patent: Jul. 28, 1987

[54] SYNCHRONOUS MOTOR PROTECTION

[75] Inventors: James W. Hamilton, Jr., Mebane; Edward A. Long, Chapel Hill, both of N.C.

[73] Assignee: General Electric Company, Charlottesville, Va.

[21] Appl. No.: 902,940

[22] Filed: Sep. 2, 1986

Related U.S. Application Data

[63] Continuation of Ser. No. 652,983, Sep. 21, 1984, Pat. No. 4,641,074.

[51] Int. Cl.$^4$ .............................................. H02P 5/40
[52] U.S. Cl. .................................. 318/706; 318/709; 318/778; 318/783
[58] Field of Search ............................... 318/705–715, 318/783, 778, 779, 798, 806; 361/23, 24, 25, 29

[56] References Cited

U.S. PATENT DOCUMENTS

| 2,308,304 | 1/1943 | Reagan | 318/706 |
| 4,286,303 | 8/1981 | Genheimer et al. | 318/798 |
| 4,288,828 | 9/1981 | Kuntner et al. | 361/23 |
| 4,291,263 | 9/1981 | Stevenson et al. | 318/706 |
| 4,470,092 | 9/1984 | Lombardi | 361/23 |
| 4,510,548 | 4/1985 | Boothman | 361/24 |
| 4,542,324 | 9/1985 | Leuthen | 318/798 |

Primary Examiner—David Smith, Jr.
Attorney, Agent, or Firm—James H. Beusse; Irving M. Freedman

[57] ABSTRACT

A digital controller for synchronous motors prevents excessive heating of squirrel cage windings during motor starting. It reduces motor excitation if the actual accrued excitation time exceeds the maximum allowable excitation time of the controlled motor. It provides for adjustment of allowable time responsive to changes in excitation voltage. The thermal characteristic of the controlled motor is automatically derived from merely a few manually entered set point values.

33 Claims, 7 Drawing Figures

SYNCHRONOUS MOTOR PROTECTION

This is a continuation of application Ser. No. 652,983, filed Sept. 21, 1984, now U.S. Pat. No. 4,641,074.

BACKGROUND OF THE INVENTION

The invention relates to systems and methods for starting synchronous motors so as to protect the amortisseur or cage winding from thermal damage including when starting synchronous motors at voltage levels reduced from the full rated motor voltage.

Polyphase synchronous motors usually have the AC excited winding on the stator core and poles and field structure on the rotor assembly. During normal operation, the rotor assembly rotates at synchronous speed which is a function of excitation frequency and the number of pole pairs. The AC winding produces a magnetic field, i.e., mmf, revolving at the synchronous frequency in the air gap between the rotor and stator assemblies. A flux that is induced in the physical rotating field structure "locks" with this rotating magneto motive force causing the rotating field structure to turn at synchronous speed and to produce "synchronous torque". However, this normal operation does not occur until the rotating field structure has been brought up to synchronous speed.

Synchronous motors require special, i.e., artificial, starting arrangements to bring them up to synchronous speed, since without such arrangements, these motors have no starting torque.

For start up and damping purposes, a squirrel cage winding, or amortisseur winding, is commonly installed adjacent to the pole faces of the motor assembly. This cage winding provides for start up in the fashion of an induction motor. The rotating magneto motive force produced by the stator winding cuts the conductors of the cage or amortisseur winding and generates voltages and currents in these bars to produce rotor magnetic poles. The rotor voltage is determined by the slip, i.e., the difference between the speed of the rotating magnetic field produced by the starter and the motor, i.e., rotor speed. This start up arrangement provides starting torque that brings the motor close to synchronous speed.

Generally, the inherent resistance of cage windings prevents the motor from running without slip and thus prevents it from attaining synchronous speed. Therefore, supplemental starting means are used to pull the motor into synchronous speed. DC excitation is applied to separate rotor field windings to create constant polarity poles in the rotor. DC excitation, however, does not provide useful torque until the rotor approaches synchronous speed. During the presence of substantial slip, dc excitation produces positive and negative torque during successive half cycles. This can result in undesirable oscillatory torque components and a negative or braking torque that reduces the acceleration torque otherwise produced. These undesirable characteristics diminish as slip is reduced. Therefore, dc excitation is usually not applied until the slip is very low, for example, 5%, equivalent to 95% synchronous speed.

The amortisseur or cage winding of a synchronous motor is essentially operative only during start up, i.e., until field winding excitation and pull in of the motor to synchronous speed. The winding must be accomodated in a limited space in the motor. It is therefore usually made of lighter material than the cage winding of an induction motor and is susceptible to overheating and thermal damage. The magnitude of the heat is related to the product of the squared value of rotor current and of the time duration of the current.

The rotor current, and thus particularly its squared value, is exceedingly high when the motor is energized while at standstill, i.e., a locked rotor condition. Thermal damage quickly results if the stalled motor is energized in excess of the very brief allowable stall time of the motor.

During start up, as the motor speed increases from standstill toward synchronous speed, cage winding heating diminishes because of the decreasing frequency of the rotor current and the increased air circulation from the fan effect of the rotor. Nevertheless, thermal damage can occur if the motor runs below synchronous speed for running times exceeding those of an acceleration schedule based on the motor characteristics.

Similarly, thermal damage can occur if the motor runs for a substantial time out of synchronism without excitation. The motor then runs as an induction motor with slip producing continuous cage current to develop torque, but also heat.

Motor controllers are therefore preferably designed to "trip", i.e., open the main contactor of the motor to remove ac excitation before permanent damage occurs under these conditions. The time duration of motor energization is therefore a primary parameter in start up protection.

Exemplary are synchronous motor controls of General Electric Company described in "Instructions Synchronous Motor Control With IC 3655A105 Solid State Starting and Protection Module", GEH-3133D. These controls integrate signals derived from the motor field winding circuit having a value representative of winding slip, an inverse function of the percentage of synchronous speed. They remove ac motor energization, i.e., "trip" the motor, when the integrated value attains a predetermined magnitude representative of allowable stall time. This arrangement provides some protection against the actual motor running time exceeding allowable stall time of the motor. However, protection is based on approximations as opposed to being readily adaptable to the specific characteristics of the motor and may not permit the motor to run for the maximum allowable running time prior to tripping.

Squirrel cage protection has also been adversely affected during reduced voltage start operation, specifically by nuisance tripping, i.e., the unnecessary removal of ac energization during start up. Synchronous motors are frequently started with ac energization reduced below the full rated voltage. Energization at full rated voltage initially produces an extremely large inrush current which can produce troublesome voltage fluctuations on the power supply lines. Start up with a reduced voltage provides a proportionate reduction of inrush current and thus reduces line fluctuations. However, with reduced voltage starting, starting torque is substantially reduced since it is proportional to the square of the energization voltage. This reduces motor acceleration and increases the time required to attain synchronous speed. Therefore, start protection controls whose acceleration schedule is based on full rated voltage operation may unnecessarily trip a motor energized with reduced voltage at a time before the motor attains synchronous speed.

After initial start up at reduced voltage, the ac energization is increased to full rated voltage to assure proper synchronous speed operation. Full rated voltage is frequently applied during start up after some finite period of reduced voltage excitation. Thus, any measures taken to minimize nuisance tripping should not adversely affect start protection accorded during the subsequent application of full rated voltage.

OBJECTS OF THE INVENTION

It is an object of the present invention to provide an improved synchronous motor start up protection system and method designed to prevent thermal damage to the amortisseur windings of the motor.

It is another object to provide such a system and method for controlling ac motor excitation to prevent thermal damage from energizing the motor for excessive time periods at speeds below synchronous speed.

It is a further object for such motor start protection to be readily adaptable to the specified electrical characteristics of the synchronous motor.

It is an additional object to provide a synchronous motor start up protection system and method that avoids unnecessary interference with motor operations, i.e., tripping, during start up while the motor is energized at voltage levels reduced from full rated voltage.

It is a further object to avoid unnecessary interference with motor operation during reduced voltage start up while, however, providing fully adequate start up protection during subsequent time intervals when full rated voltage is applied to the motor.

It is a further object to provide such motor start protection as an integral part of a motor field excitation system and method that provides for dc excitation of the rotor field winding to effect pull in to synchronous speed operation.

SUMMARY OF THE INVENTION

In accordance with one aspect of the invention, electrical signals are derived having parameters indicative of a comparison of the actual accrued motor running time and of the allowable motor running time, based on actual motor parameters, at any instantaneous actual percentage of synchronous motor speed and to reduce or remove ac motor energization responsive to that signal being indicative of actual accrued motor running time exceeding allowable motor running time at any instantaneous actual percentage of synchronous speed.

Responsive to ac motor energization at a reduced voltage magnitude, the electrical signal may be modified to extend the actual accrued running time allowable at any instantaneous actual percentage of synchronous speed with respect to the running time allowable at full rated voltage to minimize nuisance tripping.

Responsive to subsequent ac energization at full rated voltage, the electrical signal may then be modified to reduce the actual accrued running time permitted at any synchronous speed to the permitted with ac energization at full rated voltage.

DETAILED DESCRIPTION OF THE INVENTION GENERAL DESCRIPTION

Figure 1:
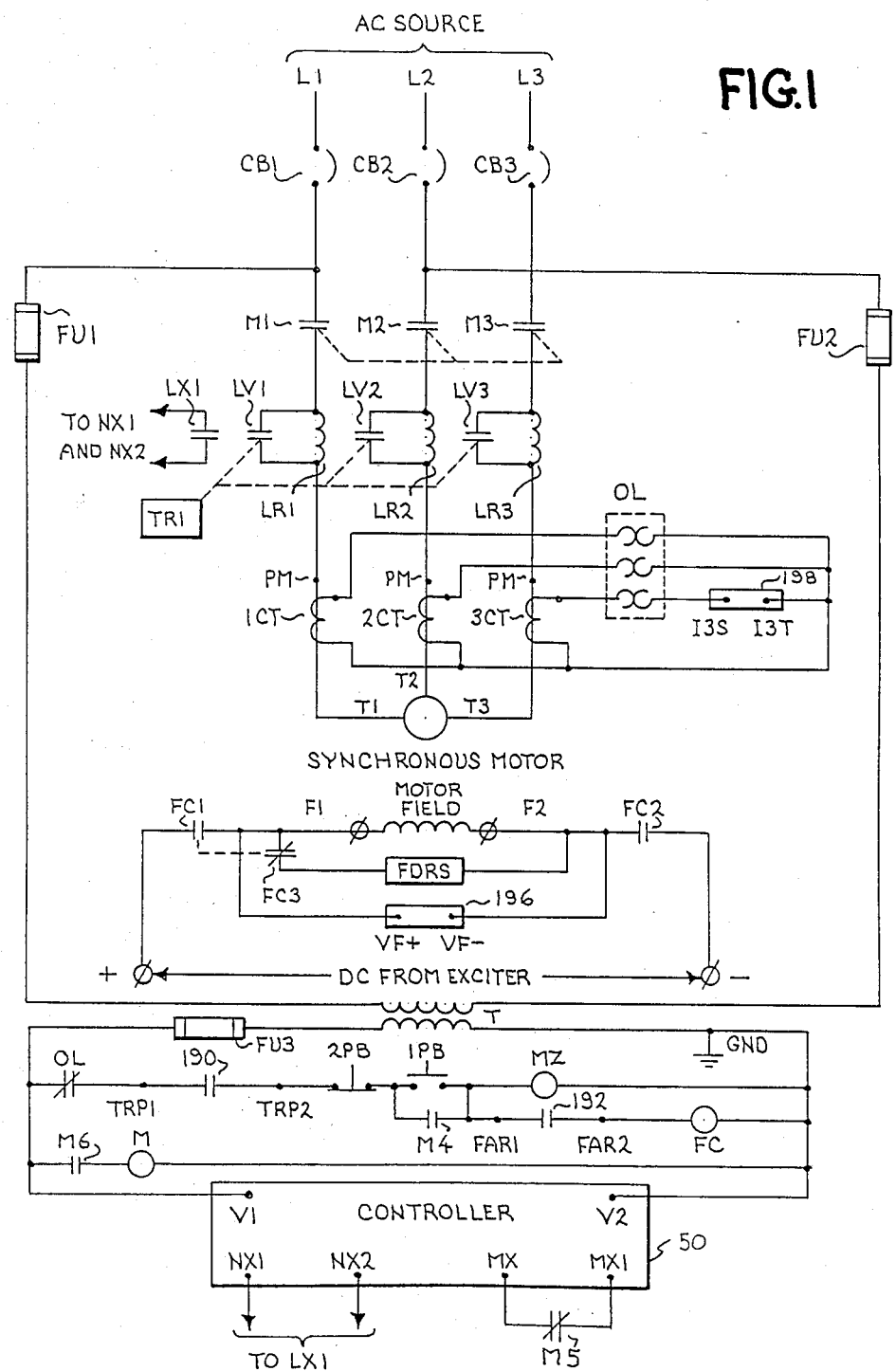
FIG. 1 is an elementary diagram of a synchronous motor controller system.

The synchronous motor control arrangement provides plural functions, including controlling motor pull in, i.e., applying dc excitation as the motor approaches synchronous speed, squirrel cage winding protection, reduced voltage start operation and phase control protection.

The preferred embodiment utilizes a microprocessor system providing for operation entry of specified motor characteristic parameters. These are utilized in combination with certain sensed motor electrical parameters to provide motor control and protection.

MOTOR PULL IN SYNCHRONIZATION

Pull in is obtained by applying dc excitation to the rotor field windings when the motor speed attains a predetermined high percentage of synchronous speed. For this purpose, the operator enters into the controller a value representative of synchronous speed, i.e., percentage of synchronous slip, when pull in is to be effected. An electrical signal that is derived from the motor and has a parameter representative of the actual instantaneous percentage of slip is processed by the controller with the operator selected value to effect pull in at the selected speed or slip.

During start up and prior to pull in, the rotor field winding is usually shunted by a field discharge resistor. This limits the field voltage to safe levels during startings. The above referenced motor signal is preferably derived from the field loop circuit comprising the field winding and discharge resistor. Specifically, the field resistor voltage has a frequency, and thus a half-cycle time duration, that is a function of motor slip.

When the motor is started against a load so as to require a high starting torque, field excitation must be applied not only at the appropriate motor speed, but also at the appropriate rotor angle. Specifically, dc excitation is applied at the occurrence of maximum induced flux producing increasing torque so that the flux provided by dc excitation supplements the induced motor flux. Excitation is thus preferably applied for a pull in period of less than one slip cycle of the rotor and at the proper speed and rotor angle so as to limit the pull in period to less than 180 electrical degrees.

The field winding current has a predetermined phase relationship to the cyclically varying magnitude of induced flux. Pull in is preferably commenced at the rotor angle when maximum flux providing increasing torque occurs, i.e., when induced field current passes through zero going from negative to positive. The field discharge loop is then opened, i.e., by disconnecting the field resistor shunt, so that the maximum flux is "trapped" and increased by the simultaneously applied dc excitation.

Prior to pull in, the field resistor voltage is essentially in phase with the field resistor current. Thus, the field winding voltage, in addition to providing an indication of motor speed, additionally provides an indication to the controller when pull in should be effected.

SQUIRREL CAGE PROTECTION

The controller also protects the squirrel cage, i.e., amortisseur, windings against thermal damage. Thermal damage occurs if the motor remains energized at standstill in excess of the allowable, i.e., rated, locked rotor stall time of the motor. The controller provides for operator entry of the stall time and removes energization from the stalled motor if the motor is energized for an excessive time. The controller also prevents thermal damage that would result if the motor would run for an excessive time at speeds below synchronous speed.

Figure 2:
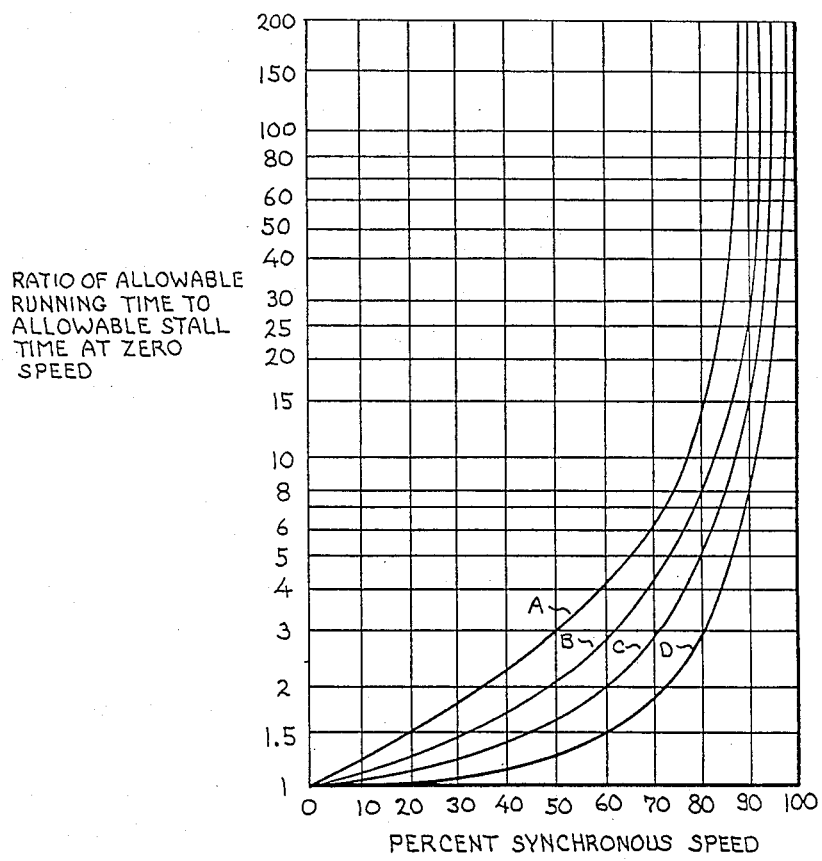
FIG. 2 is a graph of representative motor characteristics illustrating the relationship between percent synchronous speed and the ratio of allowable running time to allowable stall time at zero speed.

The allowable running time of a synchronous motor at any speed is defined by the product of locked rotor stall time and a predetermined speed multiplier K. For example, a motor having a locked rotor stall time of 10 seconds and a multiplier K of 8 at a specified speed can run for up to 80 seconds without excessive heating. The multipliers applicable at various speeds are defined by the motor's squirrel cage heating characteristics curve. FIG. 2 illustrates typical characteristics curves A, B, C and D. The lower curve represents the characteristic of a low torque starting motor. The upper curve represents those of a high starting torque motor and curves C and B represent motors of intermediate torque values. The abscissa of FIG. 2 represents the independent function of percent synchronous motor speed. The ordinate represents the dependent function of K, i.e., the allowable running time of the motor at the specified percent synchronous speed divided by the allowable locked rotor stall time.

During start up of the motor, the controller continuously compares actual accrued running time, i.e., energization time, of the motor against the allowable running time of the motor at successive speeds of the motor. The allowable running time is derived from the instantaneous speed of the motor based on the motor's characteristic curve. In the preferred embodiment, the motor characteristic is derived by the controller responsive to operator entry at least one predetermined motor characteristic parameter. For the preferred mode of squirrel cage trip protection, the operator enters the 50 percent run time ratio, i.e., the allowable time that the motor may run at 50 percent synchronous speed, expressed as a multiple of allowable motor stall time. For example, if the motor stall time is 10 seconds and the run time is programmed at 3, then the motor can run for 30 seconds at 50 percent synchronous speed.

The preferred embodiment of the controller stores in ROM tabular representations of the motor characteristic curves of FIG. 2. These stored tabular representations are in normalized form, i.e., percent synchronous speed versus K, the ratio of allowable running time to allowable stall time. The controller selects the appropriate stored curve responsive to the value of the 50 percent run time ratio, i.e., by selecting the curve having a 50 percent run time ratio closest to that entered by the operator. A signal representative of the instantaneous percent synchronous speed of the motor is then processed to derive the actual K value for the instantaneous percent synchronous speed of the motor. The preferred embodiment derives instantaneous motor speed from the above described field winding voltage signal. It processes this signal to derive a digital value representative of instantaneous percent synchronous speed. It uses this value as an index pointer to derive the K value, i.e., ratio of allowable running time to allowable stall time at the instantaneous percent of synchronous speed. This is preferably a value interpolated from the stored characteristic curves to provide a K value representative of the actual motor characteristic.

The operator additionally enters a value representative of rated stall time, i.e., the rated allowable time that power may be applied to the motor during locked rotor conditions. As described subsequently, the rated stall time value is multiplied by the K value to derive the actual allowable run time at any instantaneous percent of synchronous speed. The actual allowable run time is used to provide an updated representation of the difference between actual accrued running time and allowable running time to control, e.g. remove, motor excitation to prevent thermal damage of the squirrel cage winding.

In summary, the squirrel cage, i.e., amortisseur windings, are protected from prolonged stall and acceleration conditions during start up, i.e., from the instant of start to the time of dc field energization. Protection is based on actual motor protection characteristics. In the preferred embodiment, protection is based on stored motor characteristic curve data and operator, i.e., keyboard entries of allowable stall time and the running time at 50 percent speed as a multiple of stall time. The various operator entered values representative of motor parameters may be stored in Electronically Alterable ROM, or similar devices, that retain entered values upon power shutdown. Thus, there is no normal need to reenter them unless the parameters must be changed.

REDUCED VOLTAGE STARTING

Figure 4:
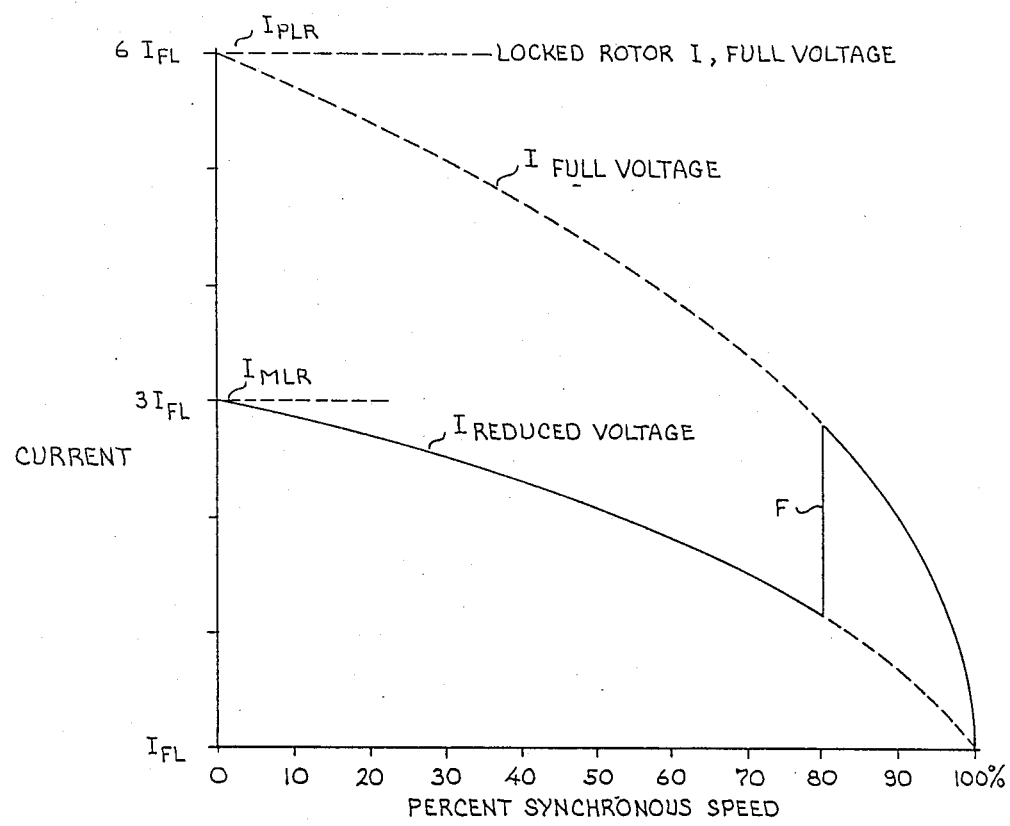
FIG. 4 is a graph illustrating the relationship of motor currents during motor starting at full rated and reduced voltage levels.

Nuisance tripping under reduced voltage starting is minimized by provisions for automatically increasing allowable running time to allow for increased time that the motor will take to accelerate. FIG. 4 compares motor current amplitudes for reduced voltage versus full voltage starting. With full voltage start up, the initial inrush current has the magnitude of full voltage locked rotor current, subsequently referred to as $I_{PLR}$. $I_{PLR}$ is substantially greater than motor current at synchronous speed, $I_{FL}$, and decreases an exponential function of slip to the value of $I_{FL}$.

With reduced voltage starting, the initial inrush current, subsequently referred to as $I_{MLR}$, has a lower magnitude, approximately in proportion to the ratio of full line voltage to reduced voltage. The motor current then diminishes, more gradually, to the $I_{FL}$ value. As previously noted, power and torque at reduced voltage excitation is reduced approximately as the square of the percent of voltage reduction, and the acceleration time during start up is substantially increased. If squirrel cage starting protection, i.e., the allowable stall and run time of the motor, is based on the parameters for full voltage starting, nuisance tripping is likely.

The subject controller minimizes nuisance tripping by extending the allowable stall and run time of the motor under reduced voltage excitation.

Squirrel cage protection is intended to prevent overheating of the cage bars and such heat is a function of $I^2t$. The lower motor current, under reduced voltage start up, permits extension of allowable stall time so as to avoid nuisance trips. The stall time under reduced voltage conditions equals the stall time under full voltage multiplied by a constant that represents the square of the ratio of the respective inrush currents or of the respective energization voltages.

For example, assume that a particular motor has a rated locked rotor current, i.e., a programmed locked rotor current ($I_{PLR}$), of 600a; a full load current at synchronous speed ($I_{FL}$) of 111a; and an allowable stall time at full voltage ($t_{SFV}$) of 10 seconds. Then the maximum $I^2t$ value for a stalled motor under full voltage conditions is:

$$I^2t_{SFV} = (I_{PLR})^2 \times T_{SFV}$$
$$= (600)^2 \times (10)$$
$$= 360,000a^2 \text{ sec.}$$

Assume that the measured inrush current under low voltage start conditions, $I_{MLR}$, is 300 amps, i.e. one half the value of $I_{PLR}$. The allowable stall time under reduced voltage start conditions, $t_{SRV}$, producing the same $I^2t_{SFV}$ product is:

$$t_{SRV} = [(I_{PLR})^2/(I_{MLR})^2] \times t_{SFV}$$
$$= [(360,000)/(300)^2] \times 10$$
$$= 40 \text{ seconds}$$

Thus, stalled rotor time under reduced voltage conditions, $t_{SRV}$, is increased over stalled rotor time under full voltage conditions, $t_{SFV}$, by a multiplier which represents the square of the ratio of these respective currents, i.e. of programmed locked rotor current to measured in rush current:

$$t_{SRV} = t_{SFV}\left(\frac{I_{PLR}}{I_{MLR}}\right)^2$$

The preferred embodiment automatically extends the allowable running time during reduced voltage starting by the above specified squared ratio. For this purpose, the controller stores the locked rotor current, $I_{PLR}$. In the preferred embodiment, the operator initially enters into the controller (a) the full load current, $I_{FL}$, and (b) the value of the locked rotor current expressed as a multiple of the motor full load current. Thus, for example, entry of a motor full load current of 100 amps and of a locked rotor current multiple of 5.5 corresponds to a locked rotor current, $I_{PLR}$, of 550 amps.

The controller also senses that starting occurs at reduced voltage, e.g., by detecting the status of an auxiliary contactor connected in circuit with the reactors, transformers, or other devices utilized to reduce the excitation voltage.

The preferred embodiment further senses the inrush current occurring at reduced voltage excitation, e.g., by a current transformer connected from a power line to the controller. The controller extends allowable running time by the above described squared ratio product as described subsequently. This squared current ratio extension is particularly desirable since the inrush current at reduced voltage is readily and automatically obtained. Less desirable alternatives are to multiply the allowable running time by the squared ratio of full rated to reduced voltage or to base both numerator and denominator values on operator entered estimated values.

REDUCED VOLTAGE TO RATED VOLTAGE OPERATION

Figure 3:
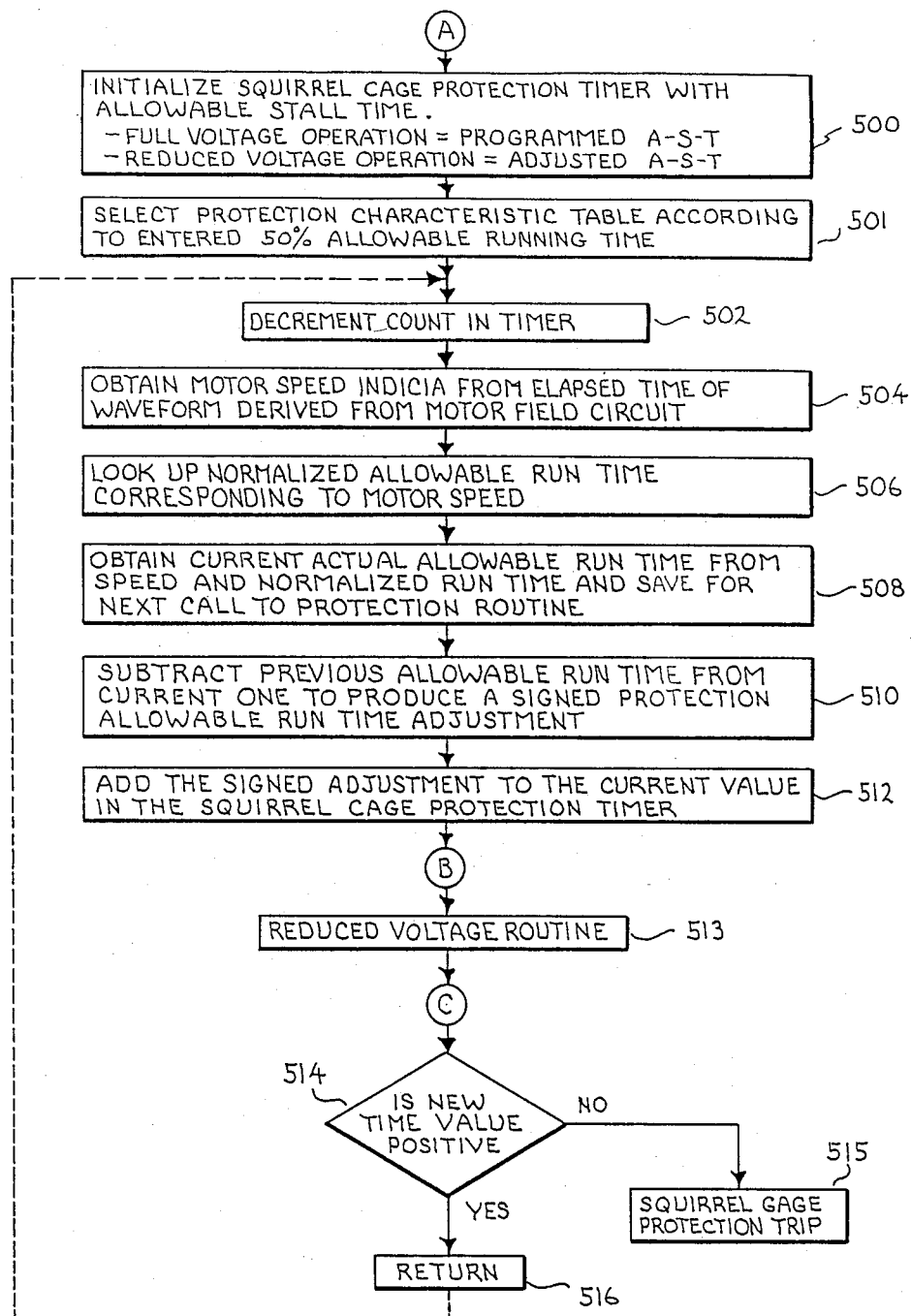
FIG. 3 is a flow chart of a preferred routine for providing squirrel cage trip protection.
Figure 5A:
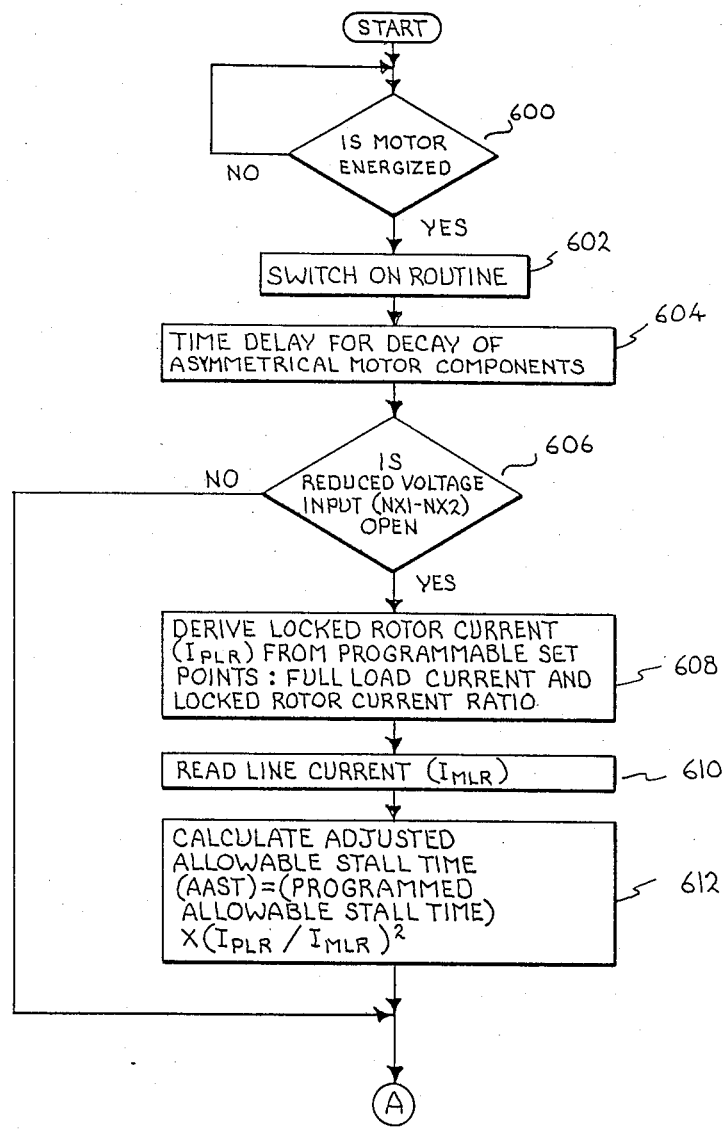
FIGS. 5A and 5B comprise flow charts of routines supplemental to that of FIG. 3 and used for reduced voltage start operation.
Figure 5B:
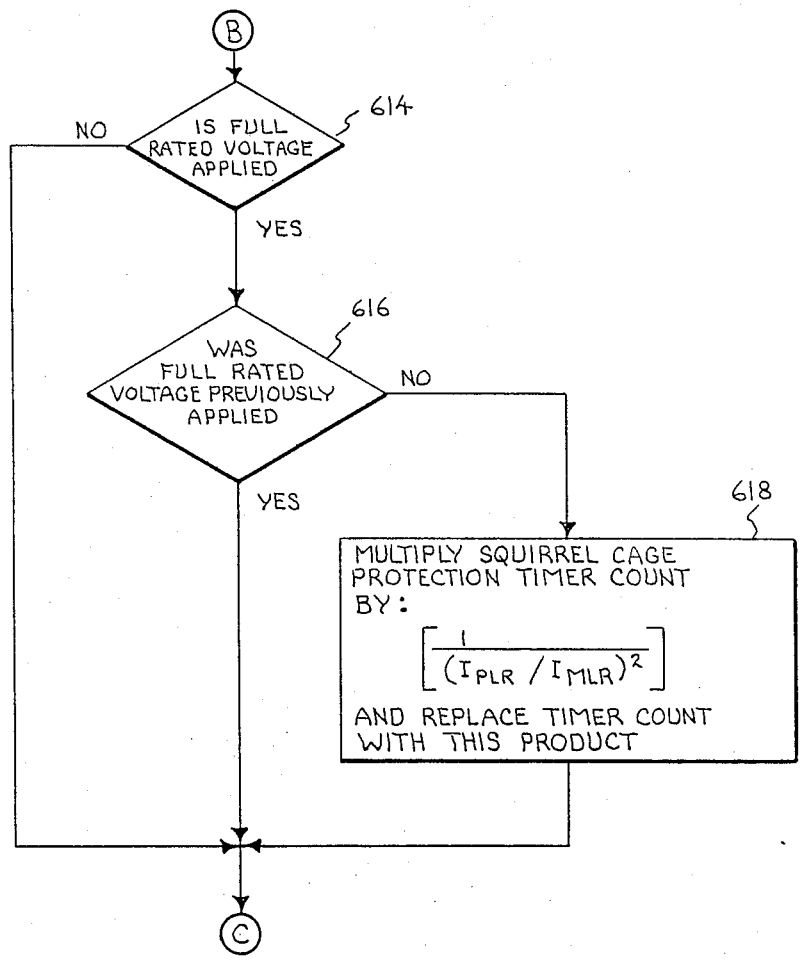

When excitation is increased during start up to full rated voltage, motor current can sharply increase. This is illustrated by line F of FIG. 4. The increased current produces greater squirrel cage heating. Under some circumstances, the heat produced by the increased $I^2t$ value during the remaining start up period can adversely affect the squirrel cage. Accordingly, when excitation is modified from reduced to full rated voltage, the squirrel cage parameters are readjusted to decrease allowable running time, i.e., to that appropriate for full rated voltage excitation. During reduced voltage excitation, the controller increases the allowable running time by multiplying the allowable running time at full rated voltage by the squared ratio of $I_{PLR}$ to $I_{MLR}$. Thereafter, when the controller detects that excitation has been increased from reduced to full rated voltage, the allowable running time is divided by this squared ratio. Effectively, the square ratio multiplier is deleted. Flow charts of squirrel cage protection including the reduced voltage start feature are illustrated in FIGS. 3, 5A and 5B and are explained subsequently.

POWER FACTOR PROTECTION

The controller additionally provides power factor protection. The preferred embodiment senses line voltage between phase 1 and phase 2, $V_{21}$, and line current of phase 3, $I_3$ to determine the power factor. In case of a lagging power factor which is indicative of improper operation, motor protection is provided as explained below.

If an excessive mechanical load is applied to the motor shaft while the motor runs in synchronism, the motor can pull out of synchronism. A lagging power factor and/or a line current surge results. The controller provides two types of pull out protection. In the "Resync mode", detection of an excessive lagging power factor removes motor field excitation, i.e., by actuation of the field application relay (FAR). The motor continues to run with field removed for a programmed Power Factor Delay Time, e.g., 3 seconds. If resynchronization does not occur within that time, the controller actuated the TRIP relay to remove energization and to stop the motor. During the Programming Mode, the operator, in addition to entering the Power Factor Delay Time, also enters the Trip Power Factor, the value of lagging power factor that will actuate protection. For example, if the Trip Power Factor is set at 0.85 lagging, the controller trips if the power factor falls below 0.85 for a time longer than the PF delay set point.

The second form of pull out protection, called the Ride-thru mode, does not immediately remove the field energization. Instead, if the power factor dips below the programmed trip power factor and persists for the programmed power factor delay time, the trip relay is actuated and excitation is removed.

Both modes are also actuated if line current exceeds approximately four times the motor full load current.

CIRCUIT AND SOFTWARE DESCRIPTION

FIG. 1 represents a typical connection diagram of a ring type synchronous motor with the controller of the subject invention. It includes motor stator, motor field and controller circuits.

The motor stator circuit provides for connection of a three phase ac source via phase lines L1, L2 and L3 through circuit breakers CB1, 2, 3, respectively, and main contactors M1, 2, 3, respectively, to respective ac stator winding connections T1, T2 and T3 of the synchronous motor. Current transformers 1CT, 2CT and 3CT, coupled to the respective phase line, have their secondaries connected to respective overload relay OL to open the main contactors in case of an overload. One of the current transformers, 3CT, has its output additionally connected through controller input terminals I₃S and I₃T, also identified as 198. This supplies a signal representative of phase 3 current to the controller. The phase 3 current signal is utilized by the controller for several functions including modifying squirrel cage protection under reduced voltage starting conditions and power factor correction.

For purpose of low voltage starting, starting reactors LR1, LR2 and LR3 are connected in series with the three phase lines, respectively, between the main contactor and the ac stator winding connection. Each of the starting reactors has a shunting contact LV1, LV2 and LV3, respectively, For normal, full voltage operation, these shunting reactors are closed. For reduced starting voltage operation, the contactors are initially open. Because of the voltage drop across the starting reactors, a reduced voltage of lower magnitude than full line voltage is initially applied to the stator winding. The shunting contactors are conventionally closed after some finite time during the start up period, so as to apply full line voltage prior to pull in. The shunting contactors may be controlled by a device, such as timer TR1. Auxiliary shunt contactor LX1 opens and closes in conformance with the state of shunting contactors LV1-3. LX1 is connected to terminals NX1 and NX2 of the controller 50 and thus provides to the latter an indication of whether full or reduced voltage operation is currently in effect. This is utilized by the controller to modify the allowable run time for squirrel cage protection as described before.

DC excitation is supplied to the motor field by a motor field circuit. This series circuit comprises exciter field terminal +, N.0. field contactor FC1, motor field terminals F1 and F2, N.0. field contactor FC2 and exciter field terminal −. DC energization is applied to the field by closure of contactors FC1 and FC2. The field discharge resistor FDRS is connected in series with N.C. field contactor FC3 to terminals F1 and F2 to shunt the motor field. The shunt connection between the resistor and motor field is removed by opening field contactor FC3. The motor field voltage is applied from motor field terminals F1 and F2 to controller inputs VF+ and VF−, respectively. These controller inputs are also identified as 196.

The motor controller circuit comprises two phase input connections from L1 and L2 respectively via fuses FU1 and FU2 to the primary of transformer T. The secondary of the transformer connected in series circuit with fuse FU3 supplies power to the controller via controller terminals V1 and V2. The transformer secondary also energizes two parallel connected control circuits. The first is a start-stop circuit comprising serially connected N.C. overload contact OL, controller trip terminal TRP1, N.0. controller contact 190, controller trip terminal TRP2, N.C. stop pushbutton 2PB, N.0. start pushbutton 1PB and auxiliary (to the main contactor) solenoid MZ. N.0. contactor M4 is in parallel with 1PB. A series circuit comprising controller "Field Application Relay" contactor 192, its contacts FAR1 and FAR2 and field solenoid FC is connected about solenoid MZ.

The second control circuit energized by the secondary of transformer T comprises serially connected N.0. auxiliary contact M6 and main solenoid M. Contact M6 is actuated by auxiliary solenoid MZ. An N.C. auxiliary contact M5, actuated by main solenoid M, is connected to controller terminals MX and MX1 to signal to the controller when the main contactor is closed.

During operation, power is applied to the secondary of transformer T and the controller 50 is turned on so as to close the controller contactor 190 between terminals TRP1 and TRP2. Upon depression of start pushbutton 1PB, the auxiliary solenoid MZ is energized. This closes N.0. contact M6 and thus energizes main solenoid M. This closes N.0. contactor M4 and latches the 1PB button. Simultaneously, N.0. main contactors M1-3 are closed to energize the ac stator windings (terminals T1, T2, T3) of the motor.

Start up commences with field discharge resistor FDRS shunted across the motor field. The voltage across this resistor is applied to controller terminals VF+ and VF−. The controller utilizes this signal to determine the appropriate speed and rotor angle when dc excitation should be applied. At such time, the controller closes its field application relay contact 192 so as to close the circuit between FAR1 and FAR2. This actuates the field solenoid FC. N.C. field contactor FC3 is thus opened to open the field discharge circuit through resistor FDRS. Simultaneously, N.0. field contactors FC1 and FC2 are closed to supply dc excitation to motor field terminals F1 and F2 so as to pull in the motor to synchronous speed.

The motor may be turned off by depressing stop pushbutton 2PB. Upon its actuation, the auxiliary to main solenoid MZ is deenergized, reopening contactor M6 and deenergizing main solenoid M. This re-opens main contactors M1-3 to remove all excitation and also reopens latching main contactor M4. In case of an overload current, overload relay OL opens contactor OL and similarly removes all excitation. In the event the controller determines that excessive heating of the squirrel cage bars or an excessively lagging power factor has occurred, it opens contactor 190 between TRP1 and TRP2. This also removes all excitation by opening the main contactor.

Figure 6:
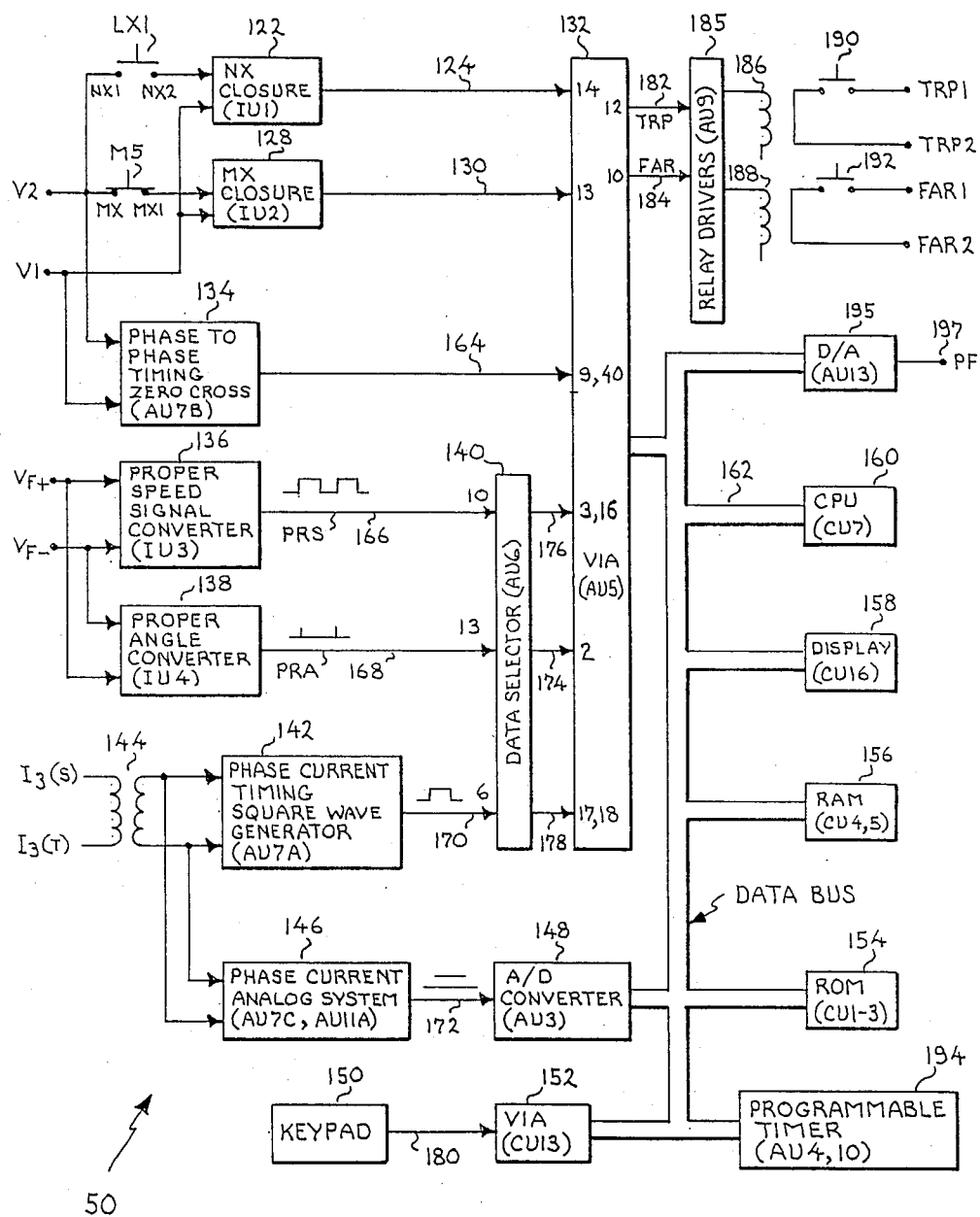
FIG. 6 is a block diagram of the motor controller.

FIG. 6 is a simplified block diagram of the preferred embodiment of the controller 50. Controller inputs from the circuit of FIG. 1 are shown on the left and controller outputs are shown on the right. The preferred controller embodiment incorporates a keypad and a display. Keypad 150 permits operator entry of parameters and selection of modes. Modes include normal operation, test, programming of reference parameter values, review and editing of stored parameter values. During normal operation, display 158 displays power factor, line current and, as an option, field current. During the programming mode displayed prompts request, display and verify parameter entries. In the programming and operating modes, certain status and error messages are displayed. The display of the preferred embodiment comprises a single line vacuum fluorescent display and a display controller.

The digital processing portion of the controller comprises Central Processing Unit 160. RAM memory 156, Read Only Memory 154, Programmable Timer 194, A/D converter 148, D/A converter 195 and Peripheral Interface Adapters 132 and 152, also referred to as VIA. These components communicate via data bus 162. The input signals from the circuit of FIG. 1 are processed as explained below and most of the resulting signals are applied to the digital processing system by Peripheral Interface Adapter 132. Some of these resulting signals are coupled to PIA 132 through data selector 140. Similarly, the trip, i.e., TRP, and field application relay, i.e., FAR, signals produced by the digital processing system are supplied from PAR 132 to relay circuits. Keypad 150 is coupled via line 180 and Peripheral Interface Adapter 152 to databus 162.

The preferred embodiment uses the following major components: CPU 160 is the well known 6809 made by Motorola and others. Programmable Timer 194 are 6840s, also made by Motorola. They can start and stop counting and be reset under control of the CPU. Peripheral Interface Adapters 132 and 152 are 6522s, originated by MOS Technology. This is a general purpose Input/Output device having two 8-bit I/O ports and bidirectional data bus pins via which communications between the CPU and the PIA occur. Each I/O port pin can be individually assigned to input or output. It also provides two internal timers whose output counts can be derived from I/O port pins 16 and 17. Data Selector 140 is a 74LS157 made by Texas Instruments and others. It is a two line to one line data selector or multiplexer. It has multiple pairs of dual inputs and single outputs so that either one of the pair of input signals can be transferred to the associated output under CPU control. FIG. 6 illustrates the relevant pin connections made to data selector 140 and PIA 132.

MOTOR START UP

When power is initially applied to the controller, prior to energization of the motor, the digital processor portion of the controller performs appropriate power up and initialization functions, and then runs a main loop executive routine, all in accordance with a program stored in ROM. An initial function is to determine when the motor is switched on (FIG. 5A-600).

As previously described with reference to FIG. 1, the energization state of the motor is communicated to the controller by the state of auxiliary contactor M5 which is connected to controller terminals MX and MX1. Prior to energization, N.C. contactor M5 shunts the terminals. When the operator depresses pushbutton PB1 and energizes the main contactor M to energize the motor, contactor M5 opens the circuit between these terminals.

Thus the digital processor determines whether or not the motor is switched on responsive to whether there is a connection between the terminals MX and MX1. Terminals V1 and V2 of FIG. 6 provide the ac output of the secondary winding of transformer T (FIG. 1). Terminal V1 is directly connected to a first input of MX closure circuit 128. Terminal V2 is connected to a second input of block 128 via terminal MX, auxiliary contactor M5 and terminals MX1. Circuit 128 essentially comprises a type 6N137 optoisolator. The input is shunted by a half wave rectifier (not shown) and the output that is connected to PIA 132 has a pull up resistor connected to a five-volt source (not shown). Before motor energization when auxiliary contactor M5 is closed, the output of 128 supplies 5 volt pulses at line frequency. This is a motor off signal. Upon motor energization when M5 is open, the output supplies a continuous 5 volt signal to pin 13 (Port B, bit 3) of PIA 132. This constitutes a motor on signal.

Upon detection of the motor on signal, the main loop executive program enters a "switch on routine". Specifically, the main loop executive routine jumps to a synchronization routine. This provides for motor start up and for squirrel cage protection (FIG. 5A-602). The synchronization routine remains in use until either (1) motor synchronization, or (2) squirrel cage protection tripping occurs.

DC FIELD EXCITATION

Motor start up requires delaying dc field excitation until the motor speed attains the specified percentage of synchronous speed. Restated, field excitation is not applied until the field slip decreases to the low percentage that is defined by the programmed parameter, i.e., set point. Field excitation is then applied at the rotor angle when maximum flux is produced. As previously described, the field winding voltage at controller terminals VF+ and VF− has characteristics that define the percentage of field slip and of the proper rotor angle. The field winding voltage is a sinusoidal signal whose frequency is proportional to slip frequency. For example, when the motor is stalled, the frequency corresponds to line frequency, e.g., 60 hz. As motor speed increases, the frequency decreases until it is zero at synchronous speed. Assuming that the entered set point is five percent synchronous speed, field excitation can be applied when the slip frequency is no more than 0.05 times the line frequency of 60 hz, i.e., when it is 3 hz.

The time duration of one cycle of the field winding voltage is inversely related to the slip frequency. The preferred embodiment of the controller determines the actual motor speed based on the duration of each half cycle of the field winding voltage. At motor standstill, i.e., slip frequency of 60 hz, the time duration per half cycle is 8.33 milliseconds. At five percent synchronous speed, i.e., a slip frequency of 3 hz, the time duration per half cycle is 166.67 milliseconds.

As shown in FIG. 6, terminals VF+ and VF− are connected to Proper Speed Signal Converter 136 which produces a "proper rotor speed" signal, identified as PRS, on output line 166. Converter 136 essentially converts the sinusoidal field voltage to a square wave signal whose leading and lagging edges correspond to the zero crossings of the sinusoidal signal. The circuitry of converter 136 is very similar to that of the previously described MX closure block 128. The preferred embodiment uses an HCLP 3700 optoisolator. The PRS signal on line 166 is coupled via Data Selector 140 and line 176 to pin 3 (Port A, bit 1) and pin 16 (Port B, bit 6) of PIA 132.

The digital processor system monitors each half cycle of the PRS square wave to determine when the slip speed decreases sufficiently to permit the application of field excitation. In the above example, this occurs when the time duration per half cycle is at least 166.67 milliseconds.

The digital processor monitors the square wave signal at pins 3 and 16 of PIA 132 to detect a transition of the square wave. Upon detecting the transition, Programmable Timer 194 counts up until the next transition is detected. The count, representative of the half cycle duration time, is compared with a stored count representative of the programmed synchronous slip set point at which field winding energization is to be applied. If the PRS half cycle count is less than the set point count, the timer is immediately cleared and counting commences for the next half cycle of the PRS square wave. Consecutive PRS half cycles are thus analyzed until the value of a PRS half cycle equals or exceeds the stored set point count. This indicates that the motor speed is sufficient to effect field energization and a PRS flag is set.

Field energization is then applied when the motor rotor attains the appropriate angle. This occurs when the motor field voltage next passes through zero. FIG. 6 illustrates that terminals VF+ and VF− are applied as inputs to Proper Angle Converter 138 which produces zero crossing pulses on line 168. These constitute a proper angle signal, or PRA. Converter 138 is similar to the Proper Speed Signal Converter 136. Converter 138 does not have a half wave rectifier connected across the inputs of the optoisolator. The optoisolator has an internal full wave rectifier. The output, PRA, signal is zero whenever the input signal is at least of a certain magnitude, e.g., 40 volts. However, the output comprises +5 volts during the intermediate, i.e., zero cross, interval of the input signal, i.e., of the field winding voltage.

The PRA signal is coupled via line 168, Data Selector 140, line 174 to pin 2 (Port A, bit 0) of PIA 132. The digital processor detects the transition of the PRA signal and sets a PRA flag. If the PRS flag is set at that time, field energization is effected. Specifically, a field application relay signal, identified as FAR, is produced at pin 10 (Port B, bit 0) of PIA 132. It is coupled via line 184 and Relay Drivers 186 to energize FAR relay 188. Contactor 192 closes the connection between terminals FAR1 and FAR2 so as to energize Field Contactor Relay FC. As shown in FIG. 1, this opens field contactor FC3 removing the shunt connection of field discharge resistor FDRS and closes field contactors FC1 and FC2 to provide dc energization to the motor field. This pulls the motor into synchronous speed operation.

SQUIRREL CAGE PROTECTION

Squirrel cage protection is provided during motor start up. Specifically, it is in effect after motor energization has been detected and the main loop executive program has jumped to the synchronization routine. Squirrel cage protection has already been generally described. The following relates to relevant software and hardware aspects. FIG. 3 illustrates specific program steps that assure that motor energization is modified, i.e., removed, if the motor is energized for a time greater than the allowable running time. The steps of FIG. 3 are preceded by those of FIG. 5A. FIGS. 5A and 5B, however, relate primarily to reduced voltage starting and are described subsequently.

Motor field excitation is removed, i.e., there is a squirrel cage protection trip, if the motor energization time, i.e., the accrued actual running time of the motor, exceeds the allowable run time.

The preferred embodiment accomplishes this by storing and updating a signed value of the net difference between the maximum allowable running time and the accrued actual running time. The signed value is stored in a squirrel protection timer or register, e.g., in RAM. The signed value comprises a digital, e.g., binary, representation of the absolute value occupying a predetermined number of bits. The state of an additional bit, e.g., the most significant bit (MSB), constitutes the sign. Conventionally, a zero bit MSB indicates a positive value and a one bit indicates a negative value. Squirrel cage protection is initiated when the sign changes indicative of accrued time exceeding allowable time. In such case, the sign switches from positive to negative, e.g., the most significant bit switches from zero to one. Thus motor tripping is initiated when the MSB is one, which can be readily determined, e.g., by masking and reading the value of the MSB or by setting and reading an appropriate flag.

Reference is made to FIG. 3 for the flow chart steps. When the motor is energized during full voltage start up, the protection time register is initially loaded with a value representative of programmed allowable stall time (Step 500). This is the Stall Time that was entered by the operator during the Programming Mode and represents the maximum allowable time that power may be applied to the motor during locked rotor conditions.

Next, the proper one of the stored protection characteristic tables is selected based on the 50 percent run time of the motor that was entered into the keypad by the operator (Step 501). As previously described, the preferred embodiment stores a plurality of tables representative of the motor characteristic curves of FIG. 2. The tables are stored in normalized form, i.e., percent motor speed versus K, i.e., the ratio of allowable running time to allowable stall time at zero speed. In the Programming Mode, the operator entered a set point value of Run Time. This represents the time that the motor may run at 50 percent speed and is expressed as a multiple of the allowable motor Stall Time. Thus the Run Time set point is also a normalized value that is used to derive the motor characteristic table having a 50 percent run time value closest to the set point value.

The preceding Steps 500 and 501 are initializing steps taken upon commencement of the squirrel cage protection program. The following Steps 502-516 (except 515), however, are in a loop that is sequentially repeated while the protection program is in effect.

The value stored in the protection timer is decremented (502). This subtracts from the stored value an equivalent to an incremental unit of time that the motor has been energized. The executive program sequentially repeats Steps 502–516 as indicated by the dashed line between Steps 516 and 502. Therefore, the stored value is continuously decremented by time increments which in the aggregate are representative of the accrued actual energization, i.e., running time of the motor.

Provision is next made to modify the stored value in the protection timer to extend the allowable energization, i.e., running time of the motor in accordance with the actual speed of the motor.

An indicia of motor speed is obtained from the elapsed time of the waveform derived from the motor field circuit (Step 504). The PRS signal derived from the motor field circuit is applied to pins 3 and 16 of PIA 132. It comprises the square wave signal whose duration is representative of the percentage of synchronous speed. As explained with reference to the application of dc energization, the digital processor portion of the controller derives a count that is representative of the instantaneous percent of synchronous speed. The count is utilized in the protection program to provide the instantaneous K value, i.e., the ratio of allowable running time to allowable stall time at zero speed. An index pointer value is derived having a magnitude representative of the count value. The index thus points to the instantaneous percent synchronous speed value in the selected table. A K value is derived from the table that corresponds to this instantaneous speed value (Step 506). This is interpolated, i.e., it can deviate from the derived table value to provide a more accurate K value than would otherwise be attainable from the limited number of stored tables.

This K value, i.e., the normalized allowable run time at the instantaneous speed, is multiplied by the allowable stall time, i.e., the Stall Time set point value to derive the current actual allowable run time. This value is stored in a Current Allowable Run Time register. It is also stored in a Previous Allowable Run Time register, since it will also be used in the next consecutive execution of the protection routine loop (Step 508).

The previous allowable run time value is then subtracted from the current allowable run time value to produce a signed allowable run time adjustment (Step 510). This signed allowable run time adjustment is then added to the current value in the squirrel cage protection timer, i.e. register (Step 512). The net value in the timer thus represents a value adjusted for accrued actual running time and also for the maximum allowable running time at the instantaneous percent of synchronous speed.

The protection program continues with a reduced voltage routine (Step 513) that is described subsequently with reference to FIG. 5B.

Finally, a determination is made of whether actual accrued running time has exceeded-the maximum allowable running time, so as to require removal of motor excitation (Step 514). As previously explained, tripping is not required if the net value has a positive sign, i.e., the most significant bit is a zero. In such case, the protection routine is repeated as indicated by return 516 and the dashed line to Step 502. However, tripping is required if the sign is not positive, i.e., is negative. In such case, the digital processor portion produces a squirrel cage protection trip signal (Step 515).

As shown in FIG. 6, the protection trip signal, TRP, is produced at pin 2 (Port B, bit 2) of PIA 132. It is coupled via line 182 and relay driver 185 to energize trip relay 186. This opens contactor 190 between terminals TRP1 and TRP2. As shown in FIG. 1, this deenergizes auxiliary to main relay MZ, contactor M6 and thus main relay M to open the main contactors M1, M2 and M3 and to thus remove motor excitation.

REDUCED VOLTAGE OPERATION

Squirrel cage protection is modified during reduced voltage operation. During motor start up at reduced voltage, the allowable running time is extended to prevent nuisance tripping. During motor start up when the reduced voltage is increased to full rated voltage, the allowable running time is decreased to that applicable to full rated voltage operation. This prevents thermal damage that might otherwise occur when there is a premature increase to full rated voltage. Reference is made to the prior explanation of these adjustments.

FIGS. 5A and 5B relate specifically to reduced voltage operation. Reference is made to FIG. 5A which includes program steps that precede those of FIG. 3. The start label of FIG. 5A symbolizes preliminary steps taken on initial energization of the controller. These include power up initialization and initiation of the main executive routine.

After start, a determination is made whether the motor is energized (Step 600). This is determined as previously described by whether contactor M5 is opened or closed on controller terminals MX and MX1. Upon motor energization, the switch on routine is called to control dc field energization and to provide squirrel cage protection (Step 602). This is followed by a time delay, e.g. of about 100 milliseconds. This permits decay of asymmetrical electric components that occur in the motor upon initial energization (Step 604).

Next, a determination is made of whether the motor is being started at full rated voltage or at reduced voltage. The full rated/reduced voltage status is communicated to the controller by N.0. contact LX1 which is auxiliary to the shunting contacts LVI-3 of the starting reactor. During full rated voltage operation, the shunting contacts are closed and auxiliary contactor LX1 closes on controller terminals NX1 and NX2. Thus, an open contactor LX1 indicates reduced voltage operation (Step 606). The circuit for detecting reduced voltage operation is shown in FIG. 6. It comprises the connection from terminal V1 to one input of NX closure circuit 122 and from terminal V2 via terminal NX1, contactor LX1 and terminal NX2 to a second input of circuit 122. The output of circuit 122 is connected via line 124 to pin 14 (Port B, bit 4) of PIA 132. Circuit 122 corresponds to that of MX closure circuit 128 and digital processor determination of the rated/reduced voltage status corresponds to the previously described determination of motor on/off status.

In case of full rated voltage operation, the program branches to point A at the bottom of FIG. 5A. This initiates the squirrel cage protection program of FIG. 3. In case of reduced voltage operation, the value initially entered into the squirrel cage protection register (FIG. 3, Step 500) is adjusted to provide the longer allowable running time. This comprises the following program steps shown in FIG. 5A.

The locked rotor current, $I_{PLR}$, is derived as the product of the full load current $I_{FL}$ and of the Locked Rotor Current ratio, both of which are operator entered set points (Step 608).

The magnitude of line current is then derived (Step 610). Since this value is derived shortly after initial motor energization, it represents the in rush current $I_{MLR}$. As shown in FIGS. 1 and 6, line current is coupled via line 3 current transformer 3CT, controller terminals I3S and I3T and voltage transformer 144 to Phase Current Analog System 146. The magnitude of the current signal applied to 146 is therefore a function of the transformer ratios of these transformers. For example, the preferred embodiment has a current transformer with 0 to 5 amp full scale secondary output and the output of transformer 144 is configured so that a 3CT output current of 5 amps produces a 2.5 volt output.

Phase current analog system 146 comprises a buffered half wave rectifier which provides a dc voltage proportional to the magnitude of line 3 current. This peak voltage signal is applied via line 172 to an input of A/D converter 148 whose digital output is applied to data bus 162. The digital processor multiplies this digital value by 0.707 to derive a root mean square signal which constitutes and is stored as the in rush current, $I_{MLR}$.

Finally, the programmed allowable stall time is multiplied by the squared ratio of $I_{PLR}$ to $I_{MLR}$ to produce the adjusted allowable stall time, i.e., adjusted AST (Step 612). The squirrel cage protection routine of FIG. 3 is then executed with the adjusted AST, instead of the programmed AST, being initially stored in the squirrel cage protection register (FIG. 3, Step 500). This provides appropriate extension of allowable running time during reduced voltage operation so as to prevent nuisance tripping.

REDUCED VOLTAGE TO RATED VOLTAGE OPERATION

After starting commences at reduced voltage, the energization voltage is conventionally increased to full rated amplitude. If this occurs prematurely, there might be thermal damage because of the extended allow: able running time. A routine is therefore incorporated into the squirrel cage protection program (at FIG. 3, 513) to assure that the extended allowable running time is reduced to the allowable running time applicable for full rated voltage operation.

This routine shown in FIG. 5B modifies the allowable running time in the event the controller determines that prior reduced voltage operation is followed by full rated voltage operation. First a determination is made of whether full rated voltage is currently applied (Step 614). This utilizes the NX closure detection circuitry. If reduced voltage operation is still in effect, the routine exits at point C and continues at Step 514 of the routine of FIG. 3.

If full rated voltage operation is detected, a determination is next made of whether full rated operation was in effect during the prior pass through the routine (Step 616). An appropriate register flag is used for this purpose. If full rated operation was also previously in effect, the routine also drops to point C and continues as just described.

However, if reduced voltage operation was in effect during the prior pass, the value stored in the squirrel cage protection register must be modified. The routine therefore branches to Step 618. This comprises multiplying the count in the protection register by the inverse of the squared ratio of $I_{PLR}$ to $I_{MLR}$ and to store this value in the protection register in lieu of its prior content. This effectively modifies the value in the protection register to a value representative of the maximum allowable running time at full rated voltage. Subsequent to this modification, the program continues at Step 514 of FIG. 3.

POWER FACTOR PROTECTION AND CORRECTION

During synchronous operation, events such as the application of excessive transient mechanical loads such as chipper loads can pull the motor out of synchronism. This is manifested either by an excessively lagging power factor or by an excessive, e.g. greater than four times normal, line current.

The controller determines the power factor and takes proper corrective action. In motor control systems utilizing solid state exciters, detection of a lagging power factor can be used to boost exciter output to increase motor torque and to thus avoid pull out.

To prevent damage, the controller removes excitation, i.e., trips the motor if the power factor lags excessively over a predetermined time. Specifically, the motor is deenergized if the power factor falls below a set point value of power factor for at least a set point time delay. The value of the lagging power factor set point, e.g. 0.85 lagging, is entered by the operator during the Programming Mode as the trip power factor set point, Trip PF. The set point time delay, e.g. 3 seconds, that will elapse before the controller takes corrective action in case of an excessively lagging power factor, is similarly entered as the power factor time delay, PF Delay. Alternatively, the controller trips the motor in case of excessive line current. Specifically, the motor is deenergized if the line current exceeds a predetermined multiple, e.g. four times, the set point value of the motor Full Load Current for the set point PF Delay time.

The controller determines the power factor from motor voltage and current. For this purpose, the controller utilizes the line 1-2 voltage signal, $V_{1,2}$, at controller inputs V1 and V2 and the line 3 current signal $I_3$ at controller inputs I3S and I3T. The power factor thus is determined from the voltage across two phases, phase 1 and 2, and by the current in the third phase, phase 3. The phase angle and thus the time relationship between $V_{1,2}$ and $I_3$ is indicative of the power factor. This can be understood upon realization that there is a predetermined phase difference, e.g. 90°, between the voltage vector $V_{1,2}$ and the voltage vector $V_3$. Thus, the phase and time relationship between $V_{1,2}$ and $I_3$ has a predetermined fixed relationship to the phase and time relationship between the vectors of phase 3 voltage $V_3$ and phase 3 current $I_3$.

The controller determines the phase angle based on the time relationship between voltage signal $V_{1,2}$ and the current signal $I_3$. These sinusoidal signals are converted into square wave signals whose edges conform to the zero crossings of the respective sinusoidal signals. The square waves are applied to the digital processing portion of the controller.

As shown in FIG. 6, the voltage signal $V_{1,2}$ is applied from terminals V1 and V2 to phase to phase timing zero cross circuit 134. This comprises an operational amplifier operating as a saturable device. Specifically, the op amp is connected as a fixed reference comparator. Its input circuit comprises a current to voltage transformer and a half wave rectifier. Its output circuit comprises a pull up resistance network connected between ground and a source of positive potential, e.g., +5 volt. The output provided on line 164 thus goes positive to the positive potential for one half cycle and goes to zero for the other half cycle. Thus, circuit 134 converts the sinusoidal signal $V_{1,2}$ to a corresponding square wave signal whose rising and falling edges correspond to the zero crossings of the signal $V_{1,2}$. This square wave signal is applied to pins 9 (Port A, bit 7) and 40 (the interrupt input to Port A) of PIA 132 for processing.

The current signal $I_3$ is applied from terminals I3S and I3T via current to voltage transformer 144 to phase current timing square wave generator 142. The circuit of 142 is similar to that of the voltage zero cross circuit 134. It converts sinusoidal signal $I_3$ to a corresponding square wave signal whose rising and falling edges correspond to the zero crossings of the signal $I_3$. This square wave signal is coupled via line 170, data selector 140 and line 178 to pin 17 (Port B, bit 7) and pin 18 (the interrupt input to Port B) of PIA 132 for processing.

During synchronous motor operation, the controller detects the rising edges of the voltage and current square waves responsive to the interrupt signals supplied to pins 40 and 18, respectively, of PIA 132.

Upon detection of a rising edge of the voltage square wave, a voltage flag is set. This commences a count in a power factor timer of Programmable Timer 194. Upon detection of the next to occur rising edge of the current square wave, a current flag is set. Timer counting is then stopped. The accumulated time count represents the time duration, e.g. delay, between the respective $V_{1,2}$ and $I_3$ signals. To determine power factor, however, requires correlating this voltage to current time duration with a function of the power frequency, i.e., the power cycle time duration. The power cycle time duration is the inverse of the frequency. For a 60 hz supply, the power cycle time duration is 16,667 microseconds. The preferred embodiment of the controller includes a programmable Line Frequency set point. This permits controller operation at various local power frequencies, i.e. 25, 50 and 60 hz.

The controller next subtracts the stored voltage to current time duration from the stored power cycle time duration. The difference, i.e. the elapsed time value, is stored as variable ELAPSD and provides an indication of power factor.

Power factor is a function of the phase angle and thus time duration between the voltage vector, e.g. $V_3$, and the current vector, e.g. $I_3$. The vector of voltage on line 3 lags the vector of the voltage between lines 1 and 2, $V_{1,2}$ by 90°. Thus, for example, if $V_{1,2}$ leads $I_3$ by 90°, $V_3$ is in phase with $I_3$ and there is unity power factor. If $I_3$ is 180° out of phase with $V_{1,2}$ and thus lags $V_3$ by 90°, there is a 90° lagging power factor. Conversely, if $I_3$ is in phase with $V_{1,2}$ and thus leads $V_3$ by 90°, there is a 90° leading power factor.

The stored elapsed time, ELAPSD, thus has a defined relationship to the power factor. The sign of the power factor, i.e. − for lagging and + for leading, is a function of whether the elapsed time is in the 1st, 2nd, 3rd or 4th quarter cycle. A lagging power factor is indicated by elapsed time occurring within the second and third quarter cycles. A leading power factor is indicated by elapsed time occurring within the first and fourth quarter cycle.

A lookup table is utilized for providing a power factor display on the controller. The independent values represent the elapsed time and the dependent values represent the power factor angle. An index pointer is produced from the elapsed time value to derive from the table the absolute value of power factor. The sign is derived from identification of the appropriate quarter. In the preferred embodiment, this is stored in a byte register in ASCII format to facilitate its display on display 158 in conjunction with the absolute value.

A digital representation of power factor is also derived from data bus 162 and applied to D/A converter 195. Its analog output is supplied by line 197 to terminal PF to provide for external use, e.g., display.

The digital processor additionally determines from the stored elapsed time whether corrective action is required, e.g., the removal of motor energization. A power factor protection routine processes the stored elapsed time value in conjunction with the Trip PR set point value to determine whether the power factor falls below the Trip PF set point value. In the Resync Mode, this initially removes motor field excitation by an FAR signal at pin 10 of PAR 132 which actuates field application relay 188. In either the Resync or Ride-thru modes, motor energization is removed if the excessively lagging power factor persists in excess of the set point PF Delay time. For this purpose, the preferred embodiment stores a count representative of PF Delay time. While the excessively lagging power factor exists, this count is decremented during successive passes through the power factor protection routine. When the timer has counted down, a TRP signal is produced at pin 12 of PAR 132. This actuates trip relay 186 and results in deenergizing the motor.

It should be apparent to those skilled in the art that while the preferred embodiment has been described in accordance with the Patent Statutes, changes may be made in the disclosed embodiment without actually departing from the true spirit and scope of the invention.

What we claim as new and desire to secure by Letters Patent of the United States is:

1. In a digital control system for protecting a plurality of synchronous motors having squirrel cage windings, during full or reduced voltage start-up, the combination comprising:
    (a) means for storing digital data representative of a plurality of thermal limit characteristic curves corresponding to a plurality of synchronous motors each having a different starting torque, said curves having an independent function representative of instantaneous motor speed and a dependent function representative of maximum allowable motor excitation time, the thermal limit characteristic curves each covering a speed range of from substantially zero speed to substantially synchronous speed;
    (b) programmable means for manual entry of data representative of at least two set points for any motor being controlled by the digital control system, each set point having a value representative of the maximum allowable motor excitation time of said controlled motor at a predetermined motor speed;
    (c) motor speed signal means for deriving a motor speed signal indicative of actual motor speed from AC energization applied to any motor being controlled by the control system;
    (d) digital processing means responsive to the digital data, the set points and the motor speed signal for sequentially deriving the maximum allowable excitation time for any controlled motor to attain any instantaneous motor speed during acceleration and for providing an output signal indicative of the actual accrued excitation time exceeding the maximum allowable excitation time said motor being controlled by the control system, said digital processing means comprising:
        selection means responsive to at least one of the set points for selecting the tabular representation of one of the plurality of thermal characteristic curves having the closest fit to the value of the at least one of the set points; and
        indexing means responsive to the value of the motor speed signal to derive a representation of the maximum allowable motor excitation time applicable to the actual motor speed from the selected one of the tabular representations of said curves; and
    (e) output means for reducing motor excitation responsive to the output signal so as to prevent thermal damage to the squirrel cage windings in a motor being controlled by the control system.

2. The digital control system of claim 1 wherein said entry means comprises means for entering a first set point representative of the maximum allowable time that the motor may be energized while at stand still and for entering a second set point representative of the maximum allowable time that the motor may be energized at a predetermined percentage of synchronous speed intermediate to stand still and synchronous speed.

3. The digital control system of claim 2 wherein the second set point is representative of the maximum allowable time that the motor may be energized at fifty perecent of its synchronous speed.

4. In a digital control system for protecting a plurality of synchronous motors during full or reduced voltage motor starting, each of said motors having squirrel cage windings and also having field winding means adapted to be connected with field resistance means in a field winding circuit during initial energization of the motor, the combination comprising:

(a) means for storing digital data representative of a plurality of thermal limit characteristic curves corresponding to a plurality of synchronous motors each characterized by a different starting torque, said curves having an independent function representative of instantaneous motor speed and a dependent function representative of maximum allowable motor excitation time, the thermal limit characteristic curves each covering a speed range of from substantially zero speed to substantially synchronous speed;

(b) programmable means for manual entry of specific motor data representative of at least two set points for a motor being controlled by the digital control system, each set point having a value representative of the maximum allowable motor excitation time of said controlled motor at a predetermined motor speed;

(c) means for deriving a motor speed signal from the field winding circuit so as to have a periodic time duration representative of the instantaneous actual percentage of synchronous motor speed, said motor speed signal being indicative of actual motor speed from AC energization applied to a motor being controlled by the control system;

(d) digital processing means responsive to the digital data, the set points and the motor speed signal for sequentially deriving the maximum allowable excitation time of a controlled motor being stimulated at full or reduced voltage startup in order to achieve its actual allowable instantaneous motor speed during acceleration and for providing an output signal indicative of the actual accrued excitation time exceeding the maximum allowable excitation time of the controlled motor, said digital processing means comprising:

selection means responsive to at least one of the set points for selecting the tabular representation of one of the plurality of thermal characteristic curves having the closest fit to the value of the at least one of the set points; and indexing means responsive to the time duration of the periodic signal for deriving the maximum allowable motor excitation time applicable to the actual motor speed for the motor being controlled by the digital control system and being stimulated at full or reduced voltage startup;

(e) output means for reducing motor excitation responsive to the output signal so as to prevent thermal damage to the squirrel cage windings in a motor being controlled by the control system; and (f) control means for protecting synchronous type motors from thermal damage upon energization of the motor for excessive time intervals at operation below synchronous motor speeds when motor excitation occurs at a full or a reduced voltage magnitude to extend the maximum allowable running time at any instantaneous actual percentage of synchronous speed with respect to the actual running time permitted with excitation at full rated voltage so that the allowable stall and run time of the motor being controlled is automatically extended under said reduced voltage excitation, said control means comprising an output means for removing motor excitations. wherein 5. The digital control system of claim 4 wherein said entry means provides for manual entry of a set point value representative of the percentage of synchronous motor speed at which DC excitation is to be applied to field winding means, to attain synchronous speed of a motor being controlled by the control system, said digital processing means further comprising means coupled to said analog means and responsive to said motor speed signal for providing a second output signal responsive to the actual motor speed attaining the percentage of synchronous motor speed represented by the set point value, and means responsive to the second output signal for applying DC energization to field winding means of a motor controlled by the control system.

6. In a digital control system which utilizes reduced starting votages for protection of synchronous type motors having ac energized stator winding means, and amortisseur winding means that are subject to thermal damage upon energization of the motor for excessive time intervals at operation below synchronous motor speed, the combination comprising:

(a) first signal means for determining a first electrical signal indicative of a comparison of the actual accrued motor running time and the allowable motor running time at any instantaneous actual percentage of synchronous motor speed;

(b) circuit interruption means for removing ac energization from the motor when the first electrical signal is indicative of actual accrued motor running time exceeding allowable motor running time at any instantaneous percentage of synchronous motor speed;

(c) first power control means for providing ac energization to the motor for a first start time period at a reduced voltage magnitude that is less than the full rated voltage; and (d) first means for modifying the first electrical signal in response to reduced voltage energization of the motor, said modifying means extending the maximum allowable running time of the motor for minimizing unecessary removal of ac energization by said circuit interruption means.

7. The digital control system of claim 6 further comprising:

(a) second power control means for providing ac energization to the motor for a second start time period at full rated voltage; and (b) second means for modifying the first electrical signal responsive to ac energization being provided at full rated voltage to reduce the actual accrued running time permitted at any synchronous speed prior to removal of ac energization from the motor to that permitted with ac energization at full rated voltage, whereby start protection is improved during the second start time period.

8. The digital control system of claim 6 wherein the first modifying means extends the allowable actual running time to substantially the product of the actual running time permitted with ac energization at full rated voltage and the squared ratio of locked rotor current at full rated voltage to inrush current at the reduced voltage magnitude.

9. The digital control system of claim 7 wherein the first modifying means extends the allowable actual running time to substantially the product of the actual running time permitted with ac energization at full rated voltage and the squared ratio of locked rotor current at full rated voltage to inrush current at the reduced voltage magnitude.

10. The digital control systems of claim 8 further comprising:
   (a) second signal means for providing an electrical locked rotor signal representative of locked rotor current at full rated voltage;
   (b) means for detecting inrush current upon ac energization of a motor at the reduced voltage magnitude; and
   (c) first deriving means for deriving the squared ratio of locked rotor current at full rated voltage to inrush current at reduced voltage magnitude.

11. The digital control systems of claim 9 further comprising:
   (a) second signal means for providing an electrical locked rotor signal repesentative of locked rotor current at full rated voltage;
   (b) means for detecting inrush current upon ac energization of a motor at the reduced voltage magnitude; and
   (c) first deriving means for deriving the squared ratio of locked rotor current at full rated voltage to inrush current at reduced voltage magnitude.

12. The digital control system of claim 10 further comprising means to delay detecting inrush current upon ac energization for a time interval sufficient to permit initial dc offset components of the motor current to diminish.

13. The digital control system of claim 11 further comprising means to delay detecting inrush current upon ac energization for a time interval sufficient to permit initial dc offset components of the motor current to diminish.

14. The digital control system of claim 6 wherein the first signal means includes:
   (a) means for storing digital speed and time data representative of the thermal limit characteristic curve of a motor defined by an independent function of the percent synchronous speed of the motor and a dependent function of allowable motor running time;
   (b) second deriving means for deriving a second electrical signal from ac energization applied to the motor that is a function of the instantaneous actual percentage of synchronous speed of the motor; and
   (c) third deriving means which utilizes the second electrical signal to sequentially obtain from the stored digital data an updated indication of the allowable motor running time at the instantaneous actual percentage of synchronous speed, and continually modifies said updated indication as a function of actual accrued motor running time.

15. The digital control system of claim 7 wherein the first signal means includes:
   (a) means for storing digital speed and time data representative of the thermal limit characteristic curve of a motor defined by an independent function of the percent synchronous speed of the motor and a dependent function of allowable motor running time;
   (b) second deriving means for deriving a second electrical signals from ac energization applied to the motor that is a function of the instantaneous actual percentage of synchronous speed of the motor; and
   (c) third deriving means which utilizes the second electrical signal to sequentially obtain from the stored digital data an updated indication of the allowable motor running time at the instantaneous actual percentage of synchronous speed, and continually modifies said updated indication as a function of actual accrued motor running time.

16. The digital control system of claim 14 for use with synchronous type motors having field winding means adapted to be connected with field resistance means in a field winding cirouit during an initial start interval, and further comprising:
   (a) third signal means which utilizes the second electrical signal from the field winding circuit to provide periodic waveforms having a time duration representative of the instantaneous actual percentage of synchronous motor speed;
   (b) third modifying means for converting the second electrical signal to a digital speed representative of instantaneous actual percentage of synchronous motor speed; and
   (c) fourth deriving means which utilizes said digital spped representation to derive from the digital data representative of the thermal limit characteristic curve of a motor an allowable motor running time at the instantaneous actual percentage of synchronous speed.

17. The digital control system of claim 15 for use with synchronous type motors having field winding means adapted to be connected with field resistance means in a field winding circuit during an initial start interval, and further comprising:
   (a) third signal means which utilizes the second electrical signal from the field winding circuit to provide periodic waveforms having a time duration representative of the instantaneous actual percentage of synchronous motor speed;
   (b) third modifying means for converting the second electrical signal to a digital speed repesentative of instantaneous actual percentage of synchronous motor speed; and
   (c) fourth deriving means which utilizes said digital speed representation to derive from the digital data representative of the thermal limit characteristic curve of a motor an allowable motor running time at the instantaneous actual percentage of synchronous speed.

18. The digital control system of any of claim 6 wherein the first electrical signal determining means further comprises:
   (a) means for storing a first digital time datum having a first value representative of maximum allowable stall time of a motor at full rated voltage.
   (b) fourth modifying means for sequentially modifying the value of the stored digital time datum as a function of actual accrued motor running time; and
   (c) fifth modifying means for sequentially modifying the value of the stored digital time datum as a function of the instantaneous actual percentage of synchronous motor speed so that the resulting stored digital time datum is indicative of whether actual accrued motor running time has exceeded allowable motor running time at any instantaneous actual percentage of syncnronous motor speed.

19. The digital control system of any of claim 7 wherein the first electrical signal determining means further comprises:
- (a) means for storing a first digital time datum having a first value representative of maximum allowable stall time of a motor at full rated voltage.
- (b) fourth modifying means for sequentially modifying the value of the stored digital time datum as a function of actual accrued motor running time; and
- (c) fifth modifying means for sequentially modifying the value of the stored digital time datum as a function of the instantianeous actual percentage of synchronous motor speed so that the resulting stored digital time datum is indicative of whether actual accrued motor running time has exceeded allowable motor running time at any instantaneous actual percentage of syncrhonous motor speed.

20. The digital control system of claim 18 wherein the first modifying means includes a means for determining a second value representative of allowable stall time at a reduced voltage magnitude.

21. The digital control system of claim 19 wherein the first modifying means includes a means for determining a second value representative of allowable stall time at a reduced voltage magnitude.

22. The digital control system of claim 20 wherein the means for determining the second value representative of allowable stall time at a reduced voltage magnitude comprises deriving the third value other than unity and multiplying the first value representative of maximum allowable running time at full rated voltage by the third value.

23. The digital control system of claim 21 wherein the means for determining the second value representative of allowable stall time at a reduced voltage magnitude comprises derving the third vlaue other than unity and multiplying the first value representative of maximum allowable running time at full rated voltage by the third value.

24. The digital control system of claim 22 wherein the magnitude of the second value is limited to a predetermined magnitude to limit the maximum allowable running time attainable during reduced voltage energization.

25. The digital control system of claim 23 wherein the magnitude of the second value is limited to a predetermined magnitude to limit the maximum allowable running time attainable during reduced voltage energization.

26. The digital control system of claim 20 further comprising a means for sensing ac energization being increased to fully rated voltage as a means for determining a fourth value representative of maximum allowable running time at full rated voltage.

27. The digital control system of claim 21 further comprising a means for sensing ac energization being increased to full rated voltage as a means for determining a fourth value representative of maximum allowable running time at full rated voltage.

28. The digital control system of claim 22 further comprising:
- (a) means for sensing ac energization being increased to full rated voltage;
- (b) means for modifying the third value to unity; and
- (c) means for determining a fifth value representative of maximum allowable running time at full rated voltage.

29. The digital control system of claim 23 further comprising:
- (a) means for sensing ac energization being increased to full rated voltage;
- (b) means for modifying the third value to unity; and
- (c) means for determining a fifth value representative of maximum allowable running time at full rated voltage.

30. The digital control system of claim 22 further comprising:
- (a) means for detecting ac energization being increased to full rated voltage; and
- (b) means for dividing the second value by the third value.

31. The digital control system of claim 23 further comprising:
- (a) means for detecting ac energization being increased to full rated voltage; and
- (b) means for dividing the second value by the third value.

32. The digital control system of claim 18 for use with synchronous type motors having field winding means adapted to be connected with field resistance means in a field winding circuit during an initial start period and wherein the fith modifying means further comprises:
- (a) means for storing a plurality of digital speed and time data representative of the motor thermal limit characteristic curve of a motor defined by an independent function of the percent synchronous speed of the motor and a dependent function of the allowable motor running time;
- (b) means for obtaining a second electrical signal from the field winding circuit that is representative of the instantaneous actual percentage of synchronous motor speed; and
- (c) a fifth means for deriving from the stored plurality of digital data a digital representation of the allowable motor running time at the instantaneous actual percentage of synchronous motor speed for modifying the stored first digital time datum.

33. The digital control system of claim 19 for use with synchronous type motors having field winding means adapted to be connected with field resistance means in a field winding circuit during an initial start period and wherein the fifth modifying means further comprises:
- (a) means for storing a plurality of digital speed and time data representative of the motor thermal limit characteristic curve of a motor defined by an independent function of the percent synchronous speed of the motor and a dependent function of the allowable motor running time;
- (b) means for obtaining a second electrical signal from the field winding circuit that is representative of the instantaneous actual percentage of synchronous motor speed; and
- (c) a fifth means for deriving from the stored plurality of digital data a digital representation of the allowable motor running time at the instantaneous actual percentage of synchronous motor speed for modifying the stored first digital time datum.

* * * * *